(12) United States Patent
Kroon (10) Patent No.: US 6,871,928 B1
(45) Date of Patent: Mar. 29, 2005

(54) SELECTIVE ENHANCEMENT OF BLACK

(75) Inventor: Stephen M. Kroon, Sherwood, OR (US)

(73) Assignee: Xerox Corporation, Stamford, CT (US)

( * ) Notice: Subject to any disclaimer, the term of this patent is extended or adjusted under 35 U.S.C. 154(b) by 63 days.

(21) Appl. No.: 10/657,020

(22) Filed: Sep. 5, 2003

(51) Int. Cl.[7] .............................. B41J 2/205; H04N 1/46
(52) U.S. Cl. ........................................ 347/15; 358/534
(58) Field of Search ...................... 347/15, 43; 358/1.9, 358/502, 521, 534, 536, 456, 296; 382/237

(56) References Cited

U.S. PATENT DOCUMENTS 5,784,049 A * 7/1998 Hall .......................... 345/599
6,122,407 A * 9/2000 Peters ........................ 382/270
6,290,330 B1 * 9/2001 Torpey et al. ............... 347/43

* cited by examiner

Primary Examiner—Lamson Nguyen
(74) Attorney, Agent, or Firm—Manuel Quiogue (57) ABSTRACT

A technique for selective enhancement of black including printing a non-black color at pixel locations identified by a candidate pixel array and which correspond to marked pixels in a predetermined pixel pattern, wherein the candidate pixel array comprises a plurality of N-pixel candidate tiles respectively associated with N-pixel image tiles of a black half-toned bit map, wherein an N-pixel candidate tile includes marked pixels only if the associated N-pixel image tile comprises a portion of a half-toned uniform region and the number of marked pixels in the associated N-pixel image tile is at least a predetermined percentage of N, and wherein the number of marked pixels in some of the N-pixel candidate tiles is less than the number of marked pixels of the associated N-pixel image tile.

26 Claims, 9 Drawing Sheets

| T(0,0) | | | | | T(0,1) | | | | | | | | | T(0,4) | | |
|---|---|---|---|---|---|---|---|---|---|---|---|---|---|---|---|---|
| 30 | 29 | 28 | 27 | 26 | 25 | 32 | 13 | 2 | 1 | 8 | 23 | 34 | 15 | 4 | 5 | 6 | 21 | 36 | 39 |

20

| 30 | 29 | 28 | 27 | 26 | 25 | 32 | 13 | 2 | 1 | 8 | 23 | 34 | 15 | 4 | 5 | 6 | 21 | 36 | 39 |
|---|---|---|---|---|---|---|---|---|---|---|---|---|---|---|---|---|---|---|---|
| 31 | 12 | 11 | 10 | 9 | 24 | 33 | 14 | 3 | 0 | 7 | 22 | 35 | 16 | 17 | 18 | 19 | 20 | 37 | 38 |
| 32 | 13 | 2 | 1 | 8 | 23 | 34 | 15 | 4 | 5 | 6 | 21 | 36 | 39 | 30 | 29 | 28 | 27 | 26 | 25 |
| 33 | 14 | 3 | 0 | 7 | 22 | 35 | 16 | 17 | 18 | 19 | 20 | 37 | 38 | 31 | 12 | 11 | 10 | 9 | 24 |
| 34 | 15 | 4 | 5 | 6 | 21 | 36 | 39 | 30 | 29 | 28 | 27 | 26 | 25 | 32 | 13 | 2 | 1 | 8 | 23 |
| 35 | 16 | 17 | 18 | 19 | 20 | 37 | 38 | 31 | 12 | 11 | 10 | 9 | 24 | 33 | 14 | 3 | 0 | 7 | 22 |
| 36 | 39 | 30 | 29 | 28 | 27 | 26 | 25 | 32 | 13 | 2 | 1 | 8 | 23 | 34 | 15 | 4 | 5 | 6 | 21 |
| 37 | 38 | 31 | 12 | 11 | 10 | 9 | 24 | 33 | 14 | 3 | 0 | 7 | 22 | 35 | 16 | 17 | 18 | 19 | 20 |
| 26 | 25 | 32 | 13 | 2 | 1 | 8 | 23 | 34 | 15 | 4 | 5 | 6 | 21 | 36 | 39 | 30 | 29 | 28 | 27 |
| 9 | 24 | 33 | 14 | 3 | 0 | 7 | 22 | 35 | 16 | 17 | 18 | 19 | 20 | 37 | 38 | 31 | 12 | 11 | 10 |
| 8 | 23 | 34 | 15 | 4 | 5 | 6 | 21 | 36 | 39 | 30 | 29 | 28 | 27 | 26 | 25 | 32 | 13 | 2 | 1 |
| 7 | 22 | 35 | 16 | 17 | 18 | 19 | 20 | 37 | 38 | 31 | 12 | 11 | 10 | 9 | 24 | 33 | 14 | 3 | 0 |
| 6 | 21 | 36 | 39 | 30 | 29 | 28 | 27 | 26 | 25 | 32 | 13 | 2 | 1 | 8 | 23 | 34 | 15 | 4 | 5 |
| 19 | 20 | 37 | 38 | 31 | 12 | 11 | 10 | 9 | 24 | 33 | 14 | 3 | 0 | 7 | 22 | 35 | 16 | 17 | 18 |
| 28 | 27 | 26 | 25 | 32 | 13 | 2 | 1 | 8 | 23 | 34 | 15 | 4 | 5 | 6 | 21 | 36 | 39 | 30 | 29 |
| 11 | 10 | 9 | 24 | 33 | 14 | 3 | 0 | 7 | 22 | 35 | 16 | 17 | 18 | 19 | 20 | 37 | 38 | 31 | 12 |
| 2 | 1 | 8 | 23 | 34 | 15 | 4 | 5 | 6 | 21 | 36 | 39 | 30 | 29 | 28 | 27 | 26 | 25 | 32 | 13 |
| 3 | 0 | 7 | 22 | 35 | 16 | 17 | 18 | 19 | 20 | 37 | 38 | 31 | 12 | 11 | 10 | 9 | 24 | 33 | 14 |
| 4 | 5 | 6 | 21 | 36 | 39 | 30 | 29 | 28 | 27 | 26 | 25 | 32 | 13 | 2 | 1 | 8 | 23 | 34 | 15 |
| 17 | 18 | 19 | 20 | 37 | 38 | 31 | 12 | 11 | 10 | 9 | 24 | 33 | 14 | 3 | 0 | 7 | 22 | 35 | 16 |

| G(0,0) | | | | G(0,1) | | | | | | | | | | | | G(0,4) | |
|---|---|---|---|---|---|---|---|---|---|---|---|---|---|---|---|---|---|
| 12 | 11 | 10 | 9 | 11 | 10 | 12 | 3 | 2 | 1 | 8 | 15 | 10 | 3 | 0 | 1 | 0 | 6 | 12 | 15 |
| 13 | 6 | 5 | 4 | 2 | 9 | 13 | 4 | 3 | 0 | 7 | 14 | 11 | 4 | 5 | 6 | 4 | 5 | 13 | 14 |
| 14 | 7 | 2 | 1 | 1 | 8 | 14 | 5 | 4 | 5 | 6 | 13 | 12 | 15 | 8 | 7 | 11 | 10 | 9 | 8 |
| 15 | 8 | 3 | 0 | 0 | 7 | 15 | 6 | 9 | 10 | 11 | 12 | 13 | 14 | 9 | 2 | 3 | 2 | 1 | 7 |
| 10 | 3 | 0 | 1 | 0 | 6 | 12 | 15 | 12 | 11 | 10 | 9 | 11 | 10 | 12 | 3 | 2 | 1 | 8 | 15 |
| 11 | 4 | 5 | 6 | 4 | 5 | 13 | 14 | 13 | 6 | 5 | 4 | 2 | 9 | 13 | 4 | 3 | 0 | 7 | 14 |
| 12 | 15 | 8 | 7 | 11 | 10 | 9 | 8 | 14 | 7 | 2 | 1 | 1 | 8 | 14 | 5 | 4 | 5 | 6 | 13 |
| 13 | 14 | 9 | 2 | 3 | 2 | 1 | 7 | 15 | 8 | 3 | 0 | 0 | 7 | 15 | 6 | 9 | 10 | 11 | 12 |
| 11 | 10 | 12 | 3 | 2 | 1 | 8 | 15 | 10 | 3 | 0 | 1 | 0 | 6 | 12 | 15 | 12 | 11 | 10 | 9 |
| 2 | 9 | 13 | 4 | 3 | 0 | 7 | 14 | 11 | 4 | 5 | 6 | 4 | 5 | 13 | 14 | 13 | 6 | 5 | 4 |
| 1 | 8 | 14 | 5 | 4 | 5 | 6 | 13 | 12 | 15 | 8 | 7 | 11 | 10 | 9 | 8 | 14 | 7 | 2 | 1 |
| 0 | 7 | 15 | 6 | 9 | 10 | 11 | 12 | 13 | 14 | 9 | 2 | 3 | 2 | 1 | 7 | 15 | 8 | 3 | 0 |
| 0 | 6 | 12 | 15 | 12 | 11 | 10 | 9 | 11 | 10 | 12 | 3 | 2 | 1 | 8 | 15 | 10 | 3 | 0 | 1 |
| 4 | 5 | 13 | 14 | 13 | 6 | 5 | 4 | 2 | 9 | 13 | 4 | 3 | 0 | 7 | 14 | 11 | 4 | 5 | 6 |
| 11 | 10 | 9 | 8 | 14 | 7 | 2 | 1 | 1 | 8 | 14 | 5 | 4 | 5 | 6 | 13 | 12 | 15 | 8 | 7 |
| 3 | 2 | 1 | 7 | 15 | 8 | 3 | 0 | 0 | 7 | 15 | 6 | 9 | 10 | 11 | 12 | 13 | 14 | 9 | 2 |
| 2 | 1 | 8 | 15 | 10 | 3 | 0 | 1 | 0 | 6 | 12 | 15 | 12 | 11 | 10 | 9 | 11 | 10 | 12 | 3 |
| 3 | 0 | 7 | 14 | 11 | 4 | 5 | 6 | 4 | 5 | 13 | 14 | 13 | 6 | 5 | 4 | 2 | 9 | 13 | 4 |
| 4 | 5 | 6 | 13 | 12 | 15 | 8 | 7 | 11 | 10 | 9 | 8 | 14 | 7 | 2 | 1 | 1 | 8 | 14 | 5 |
| 9 | 10 | 11 | 12 | 13 | 14 | 9 | 2 | 3 | 2 | 1 | 7 | 15 | 8 | 3 | 0 | 0 | 7 | 15 | 6 |

SELECTIVE ENHANCEMENT OF BLACK

BACKGROUND OF THE DISCLOSURE

Raster printing systems accomplish printing by forming small marks or dots at selected pixel locations, and are commonly implemented as electrophotographic printers and ink jet printers. In raster printing systems, it is known to print one or more non-black color dots (e.g., cyan, magenta or yellow) with black dots, for example to improve black density and uniformity in dark gray regions. However, since color-to-color registration can be less than ideal, it may be preferable not to add non-black color to black near edges where color fringes will tend to show if mis-registration is present. This can be particularly important in light half-toned grays where even a slight mis-registration could induce a noticeable hue shift.

While there are known techniques directed to reducing color fringes, they can be complex and computationally expensive.

DETAILED DESCRIPTION OF THE DISCLOSURE

Figure 1:
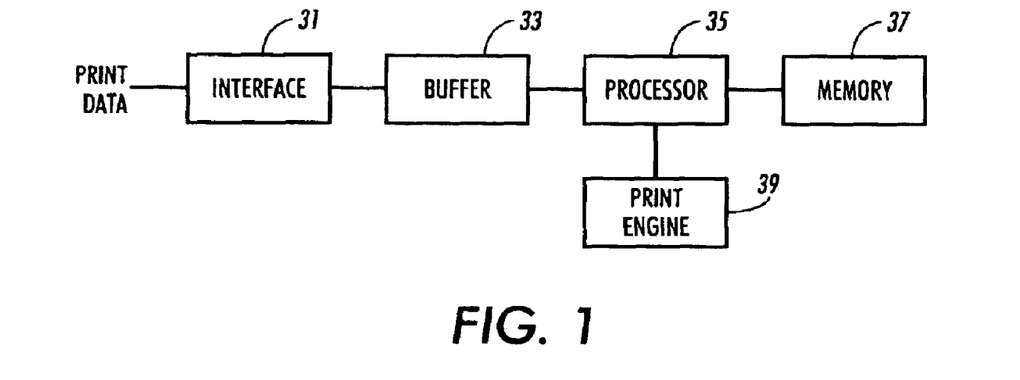
FIG. 1 is a schematic block diagram of an embodiment of a raster type printing system.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit map raster data generated by the processor 35. The print engine 39 can be an electrophotographic print engine or an ink jet print engine, for example.

Printing is accomplished by selectively printing, depositing, applying or otherwise forming markings such as dots on a receiver surface or substrate that can be a print output medium such as paper or a transfer surface such as a transfer drum. If a transfer surface is used, the image formed or printed on the transfer surface is appropriately transferred to a print output medium such as paper. In raster type printing, the markings can be formed at locations of a grid pattern that can be called a pixel array wherein each location that is capable of receiving at least one marking is called a pixel or pixel location. The data produced by the processor that defines what marking(s), if any, are to be applied to pixel locations on a pixel by pixel basis can be called pixel data. Commonly, the pixel data can comprise a plurality of one bit per pixel bit-maps, one bit-map for each primary color plane (e.g., cyan, magenta, yellow, black).

Figure 2:
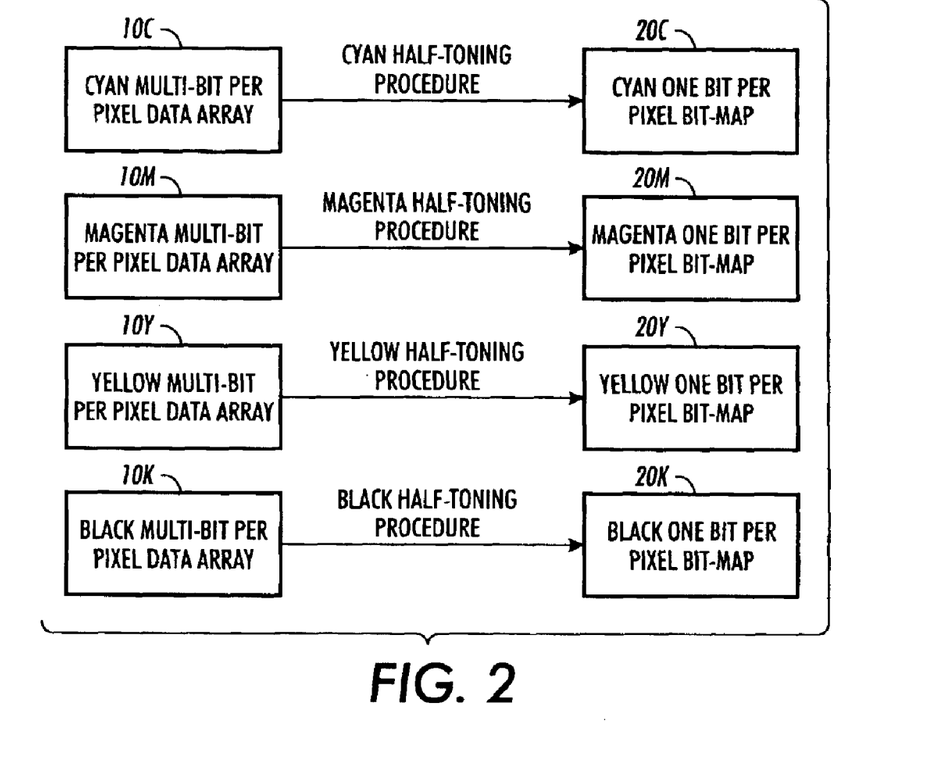
FIG. 2 is a schematic block diagram schematically depicting a transformation of multi-bit per pixel data to one-bit per pixel data.

As schematically depicted in FIG. 2, respective primary color one bit per pixel bit-maps 20C, 20M, 20Y, 20K for an image can be generated by half-toning respective primary color multi-bit per pixel data arrays 10C, 10M, 10Y, 10K. By way of illustrative example, the bit-maps and the multi-bit per pixel data arrays are for cyan, magenta, yellow and black colors. The half-toning can be accomplished for example by using a respective predetermined threshold value array for each of the primary colors. For example, different threshold values can be used for different primary colors. In this manner, single color multi-bit per pixel data is transformed to single color one-bit per pixel data.

As described more fully herein, this disclosure contemplates enhancement of black by selectively adding non-black color to half-toned black, for example by selectively marking additional pixels in at least one of the non-black primary color bit-maps.

Figure 3:
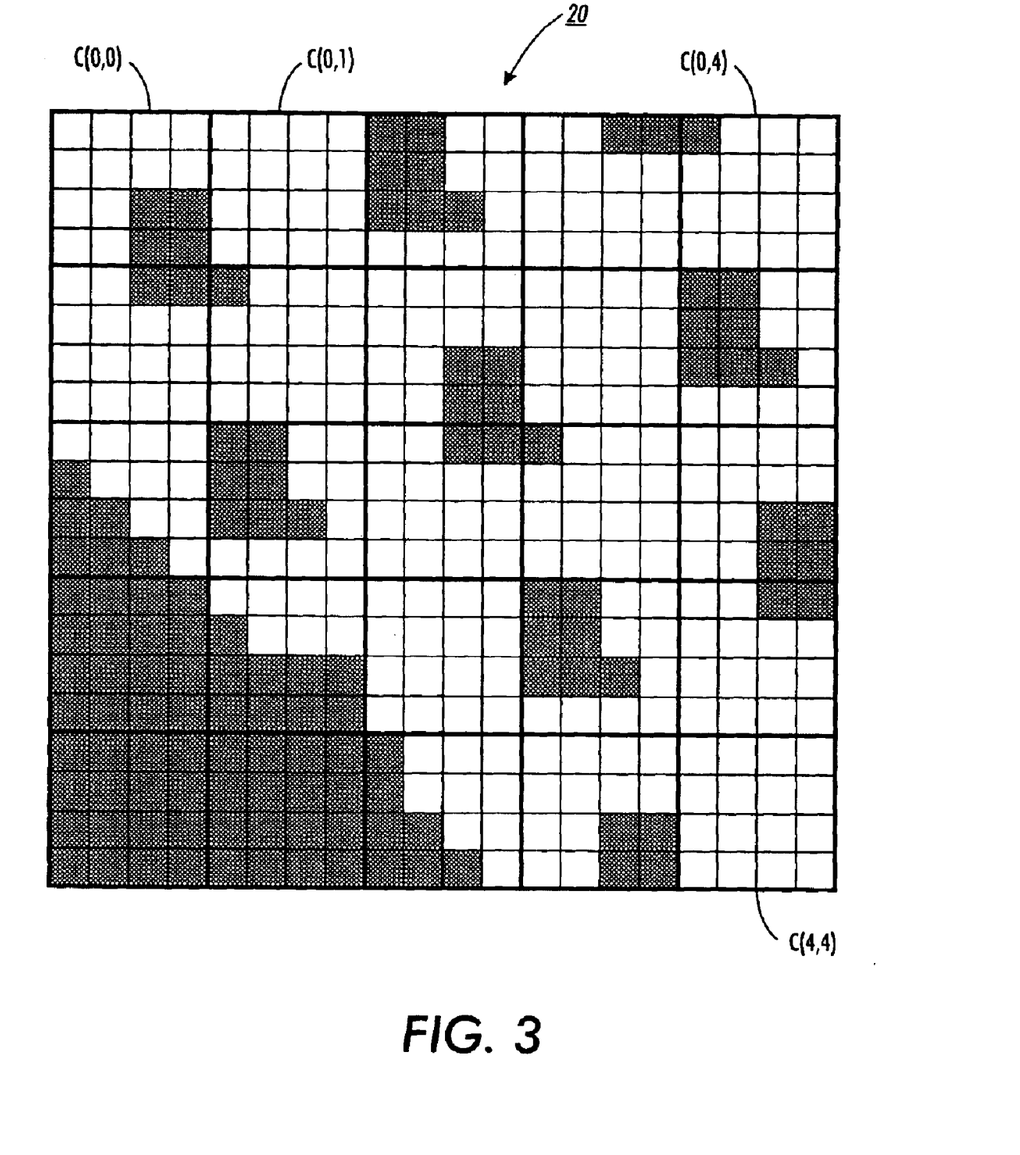
FIG. 3 is a schematic illustration of an embodiment of a half-toned one-bit per pixel black bit-map that is partitioned into a plurality of multi-pixel image tiles.

FIG. 3 is a schematic illustration of an embodiment of a black half-toned one bit per pixel bit-map 20 of an arbitrary half-toned image fragment, for example, that can be helpful in understanding the disclosed techniques. The squares represent the pixel locations of the one bit per pixel bit map, while the contents of each square represents a data bit or pixel for the corresponding pixel location. The contents of the black half-toned one bit per pixel bit-map would comprise for example the result of half-toning multi-bit per pixel data (e.g., continuous tone, gray-scale, luminance, darkness, intensity or multi-level pixel data) to bit-mapped raster data that contains one bit per pixel. Illustrating a half-toned one-bit per pixel bit-map in a grid pattern can aid in understanding that each bit is data for a particular location in a pixel array for a particular color.

Figure 4:
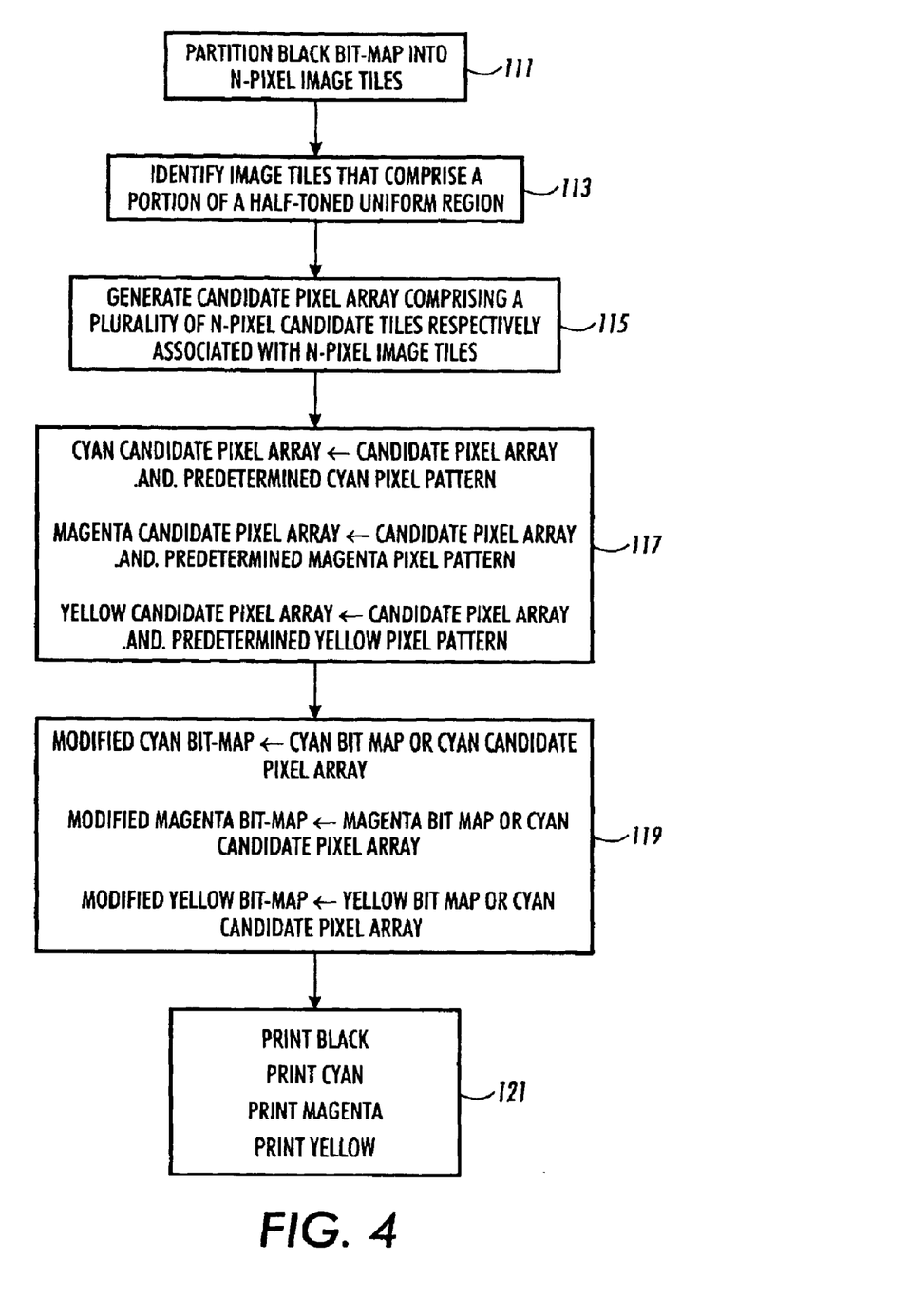
FIG. 4 is a schematic flow diagram for selectively adding non-black color to the half-toned non-black color bit maps of FIG. 2.

FIG. 4 is a schematic flow diagram of a procedure for adding non-black color to half-toned black for the illustrative example wherein the non-black primary colors include cyan, magenta and yellow. At 111 the half-toned black one bit per pixel bit map 20 for an image is organized or partitioned into N-pixel image tiles, cells or sub-groups C(0, 0) through C(4, 4), as depicted in FIG. 3. At 113, for each image tile, a determination is made as to whether an image tile is a portion of a half-toned uniform region. A half-toned uniform region comprises a region of the half-toned bit-map that represents or corresponds to a region of substantially uniform lightness or value in the pre-half-toned multi-bit per pixel data, for example. For convenience, an image tile that comprises a portion of a half-toned uniform region can be called a uniform image tile.

At 115, a candidate pixel array comprising a plurality of N-pixel candidate tiles respectively associated with the N-pixel image tiles is generated, wherein an N-pixel candidate tile includes marked pixels only if the associated N-pixel image tile comprises a uniform image tile (i.e., a portion of a half-toned uniform region) and the number of marked pixels M in the associated N-pixel image tile exceeds a predetermined marked pixel count threshold MT. For convenience, an N-pixel candidate tile having marked pixels can be refered to as a non-blank, marked or populated N-pixel candidate tile. The marked pixels in an N-pixel candidate tile for a uniform image tile comprises a subset of the marked pixels of the associated N-pixel uniform image tile, and can be fewer than the marked pixels in the associated N-pixel uniform image tile. Thus, an N-pixel candidate tile having marked pixels includes only marked pixels that correspond to marked pixels in the associated N-pixel uniform image tile. By way of illustrative example, an N-pixel candidate tile for an associated N-pixel uniform image tile having fewer than N marked pixels includes fewer marked pixels than the associated N-pixel image tile, while an N-pixel candidate tile for an associated N-pixel uniform image tile having N marked pixels can include N marked pixels. Also, an N-pixel candidate tile for an N-pixel image tile having close to N marked pixels (e.g., in the range of about 80 to 100 percent of N) can have the same number of marked pixels as the associated N-pixel image tile. An N-pixel candidate tile having fewer marked pixels than an associated N-pixel image tile can be considered a proper subset of the associated N-pixel image tile. The candidate tiles for non-uniform image tiles have no marked pixels, and the candidate tiles for uniform tiles having a marked pixel count that is less than or equal to the predetermined marked pixel count threshold MT also have no marked pixels.

By way of illustrative example, the predetermined marked pixel count threshold MT can be in the range of about 50 percent to about 80 percent of the image tile size N. As another example, the predetermined pixel count threshold MT can be in the range of about 70 percent to about 80 percent of N. Also, the predetermined marked pixel count threshold MT can be about 80 percent of N.

Also by way of illustrative example, an N-pixel candidate tile having marked pixels comprises a half-toned binary pattern that would be produced by the half-toning procedure that generated the black half-toned bit-map 20 for an area of uniform lightness or value in the pre-half-toned image data. For example, an N-pixel candidate tile having marked pixels can comprise a binary pattern that would be produced for the associated image tile if such image tile comprised a portion of a lighter uniform region. In this manner, a marked candidate tile can be considered as also comprising a portion of a half-toned uniform region. For the particular example wherein, for each image tile location, the binary patterns employed for an image tile that comprises a portion of a half-toned uniform region are generated by a predetermined sequence of marking, filling or populating of pixels of an N-pixel tile, an N-pixel candidate tile having marked pixels can comprise a binary pattern that is earlier in the marking sequence. In other words, a candidate tile is marked or populated in substantially the same sequence as an associated image tile that comprises a portion of a half-toned uniform area, and can be marked to a less dark level so as to be a less populated pattern that would be employed for an associated image tile location if the image tile at such tile location comprised a portion of a lighter half-toned uniform region.

The number of marked pixels in an N-pixel candidate tile can comprise a function of the number of marked pixels in the associated uniform image tile that are in excess of the predetermined threshold marked pixel count MT. For example, the number of marked pixels in an N-pixel candidate tile having marked pixels can increase from 0 to N for a marked pixel count M that increases from the predetermined marked pixel count MT to N:

MARKED PIXELS IN CANDIDATE TILE=
INTEGER[$N*(M-MT)/(N-MT)$]

for M=MT+1 to M=N, and wherein INTEGER comprises an integer function (e.g., by truncation or rounding of the argument).

At 117 the candidate pixel array is respectively logically ANDed with a predetermined cyan pixel pattern, a predetermined magenta pixel pattern, and a predetermined yellow pixel pattern to produce a cyan candidate pixel array, a magenta candidate pixel array and a yellow candidate pixel array.

The predetermined cyan pixel pattern generally identifies those pixel locations on the output media that can receive cyan in addition to black. The predetermined magenta pixel pattern generally identifies those pixel locations on the output media that can receive magenta in addition to black. The predetermined yellow pixel pattern generally identifies those pixel locations on the output media that can receive yellow in addition to black.

The cyan candidate pixel array defines those pixel locations in the output media that are to receive cyan in addition to black. The magenta candidate pixel array defines those pixel locations in the output media that are to receive magenta in addition to black. The yellow candidate pixel array defines those pixel locations in the output media that are to receive yellow in addition to black.

At 119 the cyan half-toned bit map, the magenta half-toned bit map and the yellow half-toned bit map are respectively logically ORed with the cyan candidate pixel array, the magenta candidate pixel array and the yellow candidate pixel array to produce a modified cyan half-toned bit map, a modified magenta half-toned bit map and a modified yellow half-toned bit map. In this manner, those non-marked pixels of the cyan bit-map that correspond to the cyan candidate pixels are marked, so as to mark all pixels in the cyan bit-map that correspond to the cyan candidate pixels. Those non-marked pixels of the magenta bit-map that correspond to the magenta candidate pixels are marked, so as to mark all pixels in the magenta bit-map that correspond to the magenta candidate pixels. Those non-marked pixels of the yellow bit-map that correspond to the yellow candidate pixels are marked, so as to mark all pixels in the yellow bit-map that correspond to the yellow candidate pixels.

At 121 black is printed at pixel locations identified by the black bit-map, cyan is printed at pixel locations identified by the modified cyan bit-map, magenta is printed at pixel locations identified by the modified magenta bit-map, and yellow is printed at pixel locations identified by the modified yellow bit-map.

It should be appreciated that the printing of black, cyan, magenta, and yellow can be performed in any order. Also, black can be printed before the other colors, or after. Still further, the additional color can be added to fewer than all of the non-black color bit maps. For example, the additional color can be added to only one of the non-black color bit maps.

Each predetermined non-black color pixel pattern can comprise a pattern of substantially dispersed or diffuse non-black color pixels, for example.

Each predetermined non-black color pixel pattern can also comprise a pattern of substantially homogeneously distributed pixels.

Each predetermined non-black color pixel pattern can be derived from a dispersed dot half-tone screen, or a stochastic half-tone screen, for example.

To the extent that a plurality of predetermined non-black color pixel patterns are employed, the predetermined non-black color pixel patterns can be aligned, partially co-incident, or mutually exclusive. For the particular example wherein predetermined cyan, magenta and yellow pixel patterns are employed, such pixel patterns can have substantially the same on-pixel population, for example, depending upon how equal amounts of C, M and Y match black.

By way of illustrative example, mutually exclusive single color cyan, magenta and yellow added color pixel arrays can be derived from non-overlapping portions of a bi-level half-tone threshold array. For example, the pixels that correspond to a lower portion of the threshold array can be assigned to a first color (e.g., magenta), the pixels that correspond to a middle portion of the threshold array can be assigned to a second color (e.g., cyan), and the pixels that correspond to an upper portion of the threshold array can be assigned to a third color (e.g., yellow).

Figure 5:
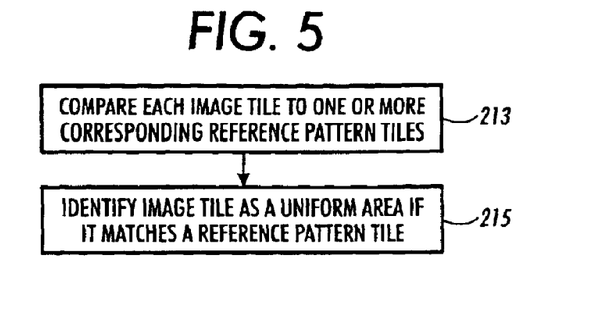
FIG. 5 is a schematic flow diagram of an embodiment of a procedure for identifying uniform areas in the half-toned black bit-map of FIG. 3.

FIG. 5 is a schematic flow diagram of a procedure that can be employed to identify image tiles that are portions of half-toned uniform areas in the half-toned bit-map 20. At 213 each image tile is compared with one or more N-pixel corresponding reference pattern tiles, wherein an N-pixel reference tile comprises a half-toned binary pattern that would be produced by the half-toning procedure that generated the half-toned bit-map 20 if the pre-half-toned multi-bit pixel data that resulted in such image tile were of uniform lightness or value. In other words, each reference pattern tile for a given image tile location comprises a half-toned binary pattern for an image tile that comprises a portion of a half-toned uniform area. At 215, if an N-pixel image tile matches a corresponding reference pattern tile, such N-pixel image tile is identified as an image tile that comprises a portion of a half-toned uniform area.

By way of illustrative example, the reference pattern tiles can comprise half-toned patterns that would be produced for pre-half-toned data of uniform lightness by half-toning pursuant to the threshold value array employed to produce the half-toned black bit-map 20. In other words, the reference tiles can comprise binary patterns that would be produced pursuant to half-toning to represent portions of pre-half-toned regions of uniform lightness and thus comprise portions of half-toned uniform regions, wherein such binary patterns are produced by half-toning pursuant to the threshold value array employed to produce the half-toned black bit-map. For example, as described further herein, a reference pattern tile can have a pattern that corresponds to the relative ordering of the half-tone threshold values for such corresponding image tile. In other words, the pixels of a reference pattern tile can be filled or marked in a sequence that corresponds to the relative ordering of the half-tone threshold values of the corresponding image tile. Further, the number of marked pixels in a reference tile can be identical to the image tile with which the reference is being compared. Thus, for example, for each image tile location in the bit-map, there can be a plurality of references tiles that can be indexed by marked pixel count. Each image tile can be compared with a corresponding reference tile having the same number of marked pixels.

Figure 6:
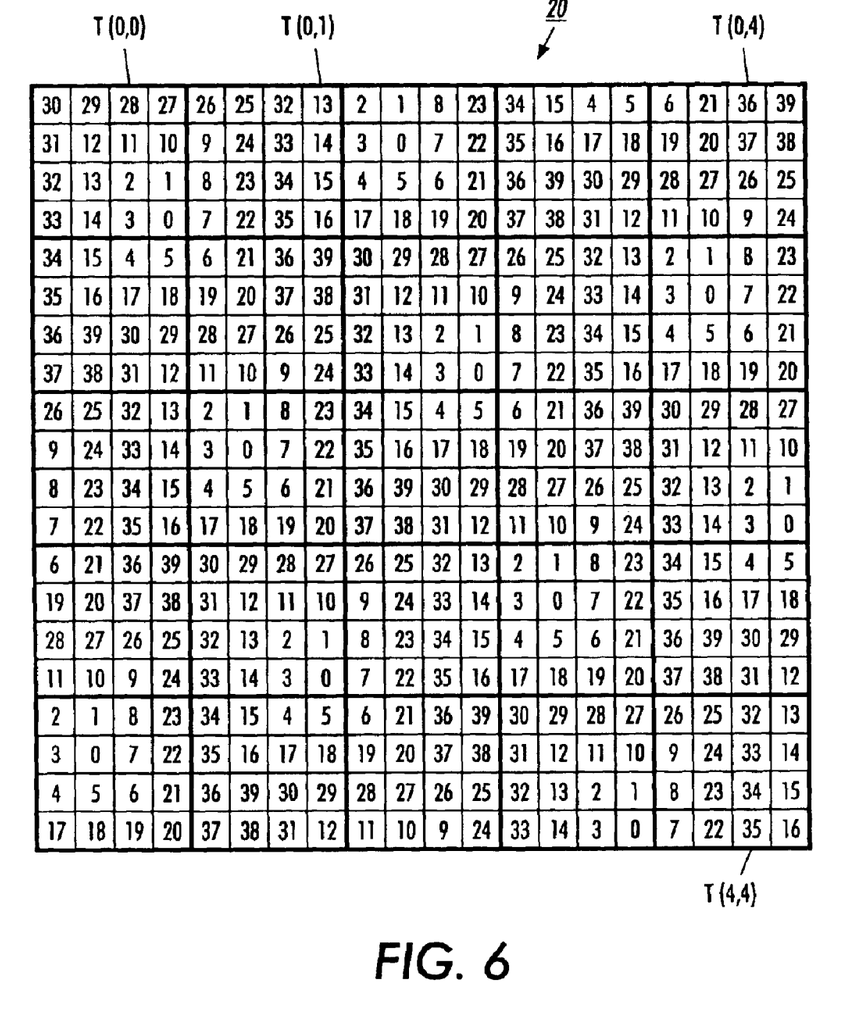
FIG. 6 is a schematic diagram of a half-tone threshold value array that can be employed to produce the half-toned black bit-map of FIG. 3.
Figure 7:
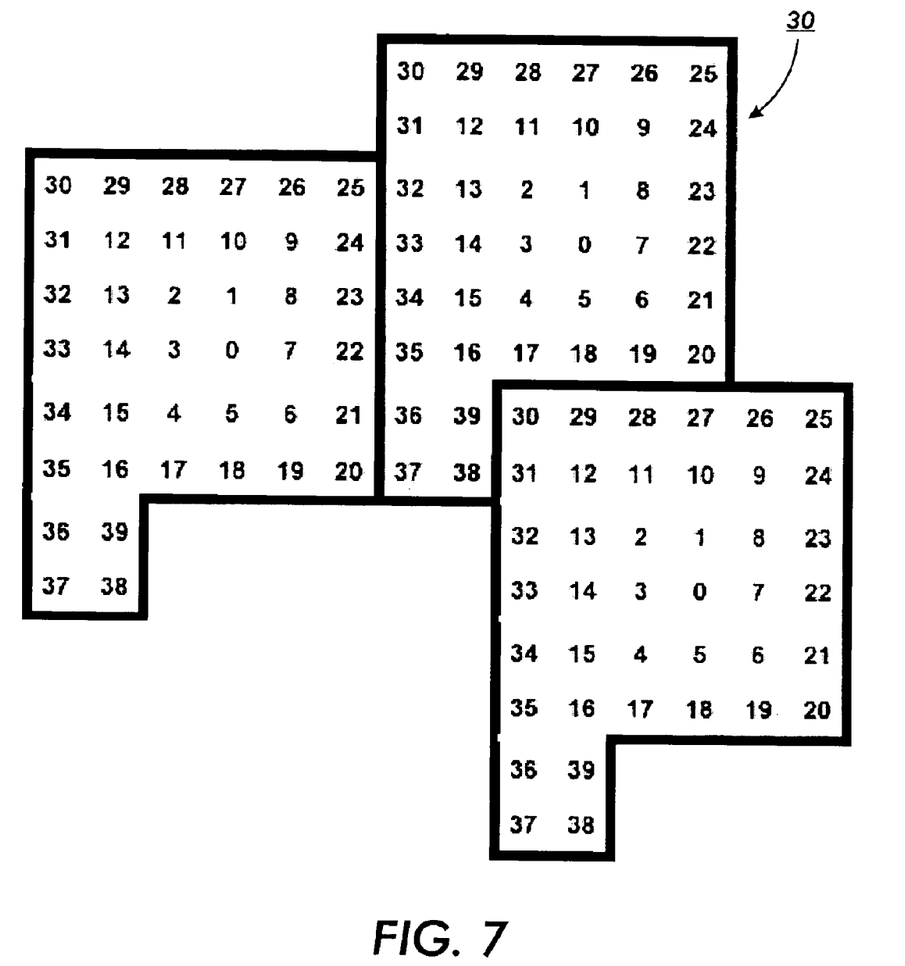
FIG. 7 is a schematic illustration of an embodiment of a half-tone cell that was employed to form the half-tone threshold value array illustrated in FIG. 6.

FIG. 6 is an embodiment of a half-tone threshold value array that can be employed to generate the half-toned bit-map 20 of FIG. 3. Each pixel location of the half-toned bit-map 20 of FIG. 3 has an associated half-tone threshold value as represented by the threshold value inscribed at each of the threshold value array locations that correspond to the pixel array locations of the bit-map of FIG. 3. For ease of illustration, the half-tone threshold value array comprises a tessellation of a 41-level half-tone cell 30 shown in FIG. 7. In actual implementations, the half-tone cells employed can be larger or smaller. The half-tone threshold value array of FIG. 6 is arranged or grouped into threshold array tiles or subgroups T(0, 0) through T(4, 4) that are associated with the half-toned bit-map tiles C(0, 0) through C(4, 4).

Figure 8:
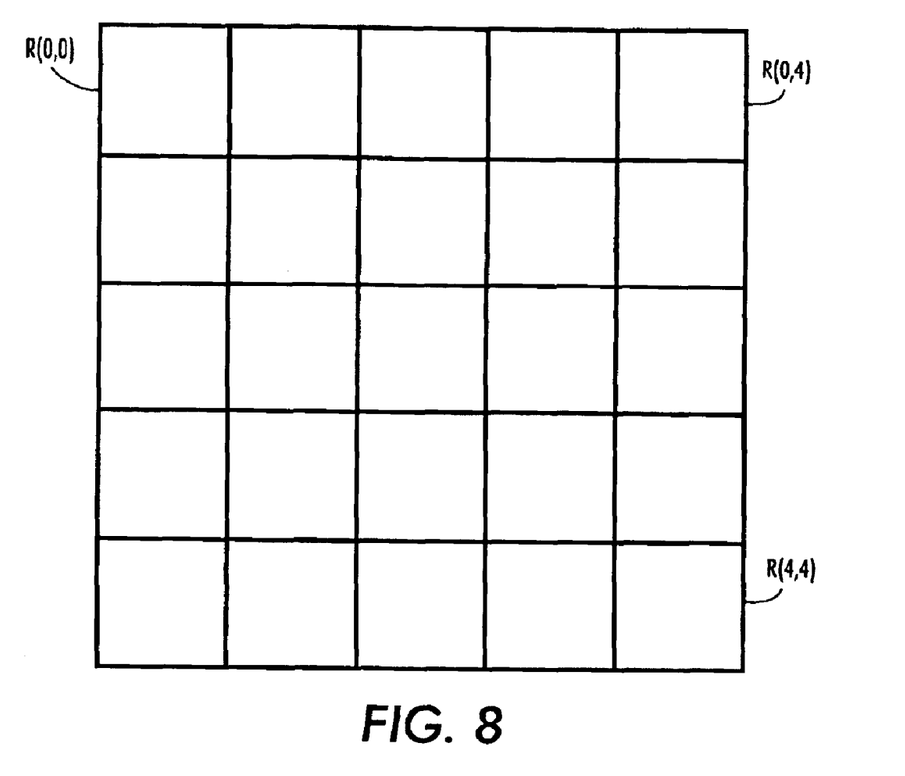
FIG. 8 is a schematic block diagram of an array of groups of reference patterns respectively associated with the array of image tiles of the black bit-map of FIG. 3.
Figure 9:
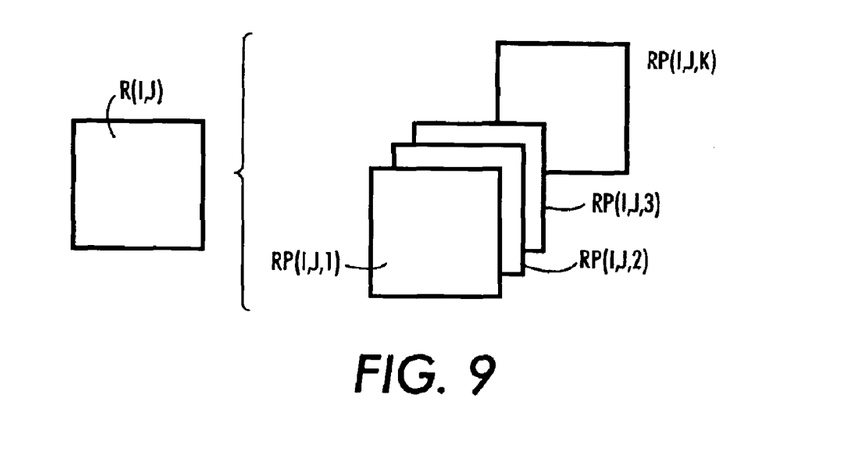
FIG. 9 schematically depicts that each of the groups of reference patterns includes a plurality of reference pattern tiles.

FIG. 8 is a schematic illustration of an embodiment of a reference pattern array that is organized or partitioned into a plurality of reference pattern groups R(0, 0) through R(4, 4) that are respectively associated with respective image tiles C(0, 0) through C(4, 4) of the bit-map 20 of FIG. 3. As schematically depicted in FIG. 9, each reference pattern group R(I, J) includes a plurality of N-pixel reference patterns RP(I, J, K) that are respectively of the same size (i.e., number of pixels) and shape (i.e., number of rows and number of columns) as the respectively associated image tiles C(I, J) of the bit-map of FIG. 3. In this manner, the reference pattern array can be considered a three-dimensional array of reference patterns or tiles RP(I, J, K).

Figure 10:
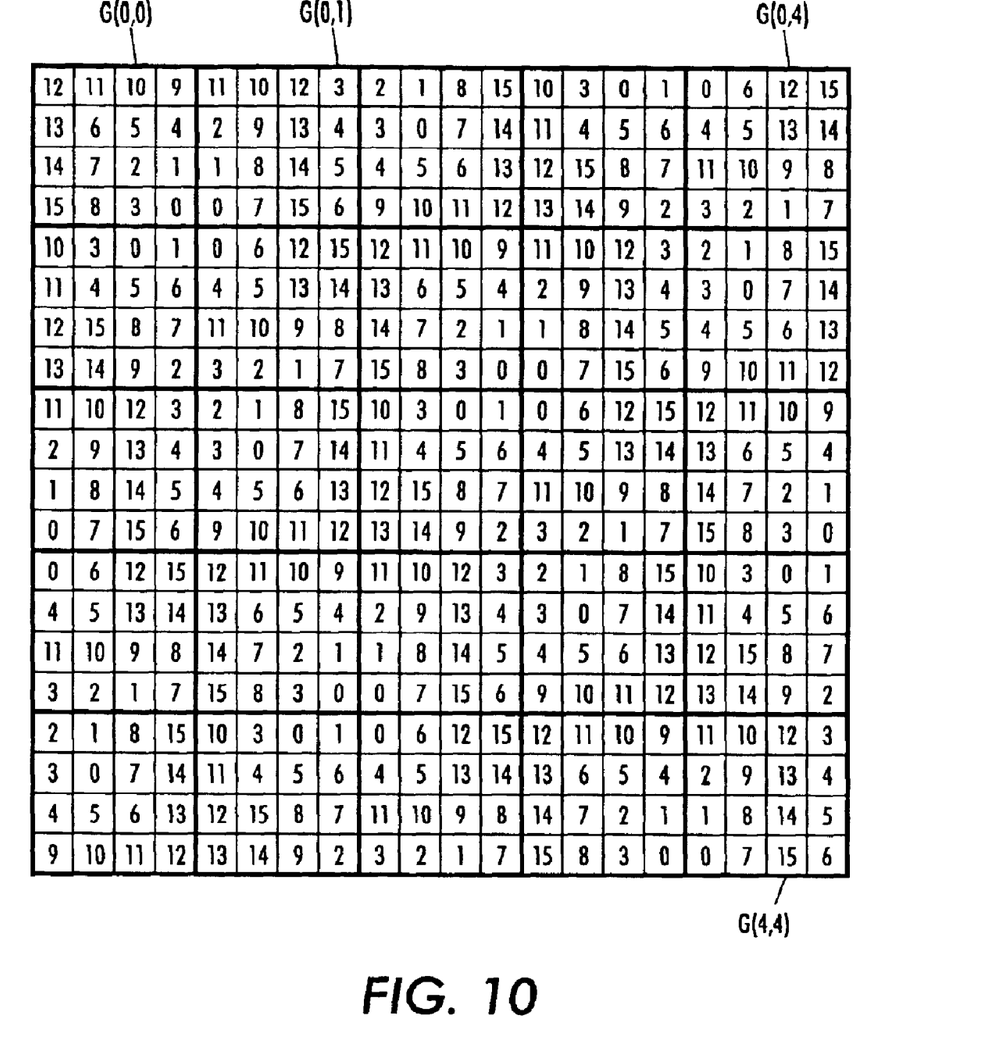
FIG. 10 is a schematic block diagram of an array of reference pattern generating pixel tiles that can be employed to generate reference pattern tiles.

FIG. 10 is a schematic illustration of an embodiment of a pixel array of reference pattern generating tiles, cells or subgroups G(0, 0) through G(4, 4), wherein the pixel locations of the pixel array of FIG. 10 correspond to the pixel locations of the bit-map of FIG. 3. The reference pattern generating tiles G(0, 0) through G(4, 4) are associated with the reference pattern groups R(0, 0) through R(4, 4), the threshold value array tiles T(0, 0) through T(4, 4), and the bit-map tiles C(0, 0) through C(4, 4). Each reference pattern generating tile is same size (i.e., number of pixels) and shape (i.e., number of rows and number of columns) as the respectively associated image tile of the pixel array of FIG. 3.

Each pattern generating tile G(0, 0) through G(4, 4) includes a fill order pattern that is based on the associated threshold value array T(0, 0) through T(4, 4). For example, the fill order values associated with a reference pattern generating cell correspond to the relative ordering of the threshold values in the corresponding threshold value array cell. That is, each pixel of a pattern generating tile G(0, 0) through G(4, 4) more particularly has an associated fill-order value or sequence number that corresponds to the relative order of the corresponding threshold value in the corresponding threshold value array cell T(0, 0) through T(4, 4), such that each pixel of a pattern generating cell has an associated fill-order value between 1 and N for the particular example of an N-pixel image tile. In the event that the same threshold value is associated with two or more pixels in a pattern generating tile, two or more in sequence numbers can be arbitrarily respectively assigned to such two or more pixels. In this manner, each reference pattern generating tile includes pixels having each of the sequence numbers from 1 through N.

Figure 11:
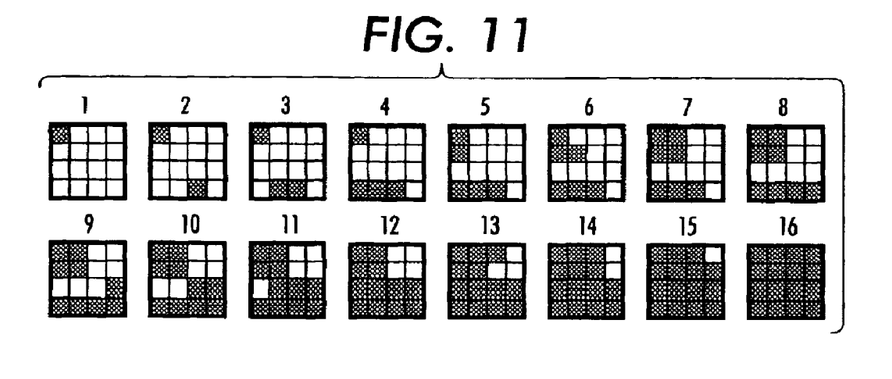
FIG. 11 is a schematic illustration of embodiments of reference pattern tiles for the different marked bit counts that would be generated by the upper right hand pattern generating tile of FIG. 10.

The N-pixel reference pattern tiles RP(I, J, K) for each reference pattern group R(0, 0) through R(4, 4) are generated by generating a binary pattern for each sequence number in the corresponding reference generating tile, wherein the marked pixels comprise the pixel associated with such sequence number and the pixels associated with any smaller sequence number(s). FIG. 11 is a schematic illustration of embodiments of the N-pixel reference pattern tiles RP(0, 0, K), for K=1 through K=16, for the upper right hand reference pattern group R(0, 4) that would be generated by the different sequence numbers of the corresponding pattern generating tile G(0, 4).

Since an image tile can match only a reference pattern tile that has the same number of marked pixels, an image tile conveniently needs to be compared only to that reference pattern tile in the corresponding group of reference pattern tiles that has the same number of marked pixels. Thus, the location and marked pixel count for an image tile can be conveniently used as an index to the corresponding group of reference patterns wherein the reference patterns can be identified by the number of marked pixels they contain, for example. That is, the index K for the reference pattern tiles RP(I, J, K) of the reference group R(I, J) corresponds to the number of marked pixels in the Kth reference pattern tile.

It should be noted that the foregoing generates reference pattern tiles having at least one marked pixel since an image tile having zero marked pixels can conveniently be classified as comprising a portion of a half-toned uniform without comparison to a reference tile having no marked pixels. Similarly, an image tile having all pixels marked can be conveniently classified as comprising a portion of a half-toned uniform region without comparison to a reference pattern tile.

Figure 12:
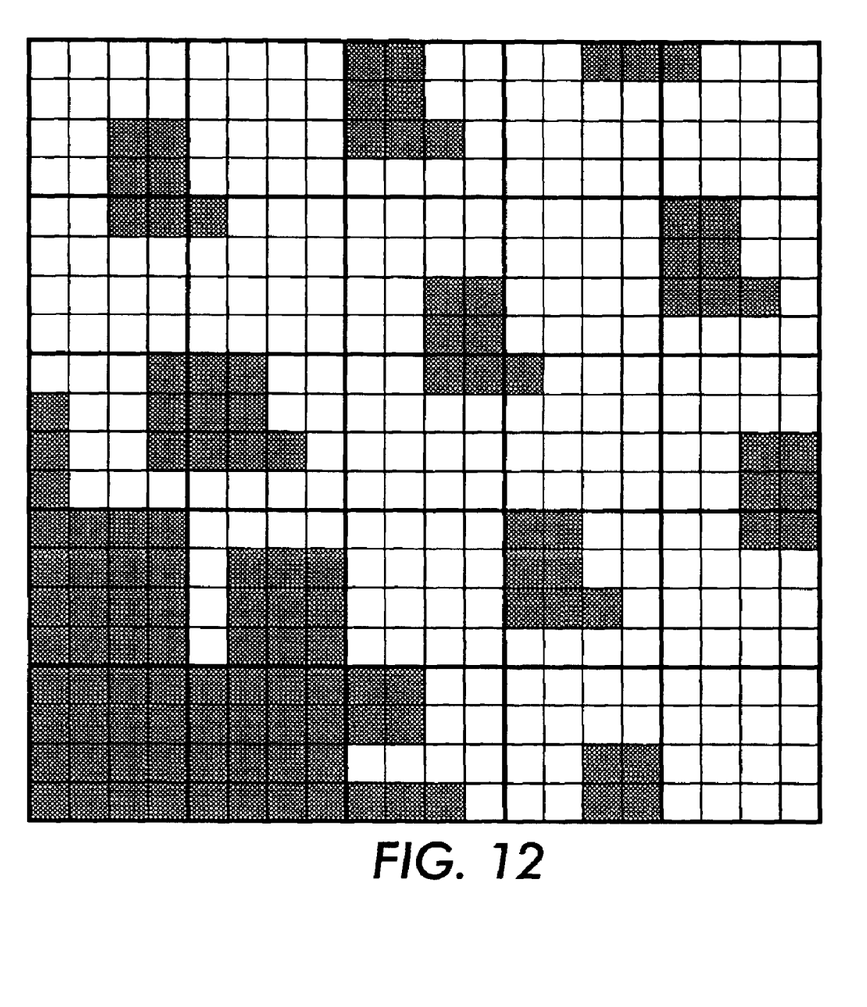
FIG. 12 schematically illustrates an embodiment of reference pattern tiles that can be compared with the image tiles of the bit-map of FIG. 3 pursuant to the procedure of FIG. 5.

FIG. 12 schematically illustrates an embodiment of a pixel array that contains the reference pattern tiles that would be compared with the bit-map of FIG. 3 pursuant to the procedure of FIG. 4.

Figure 13:
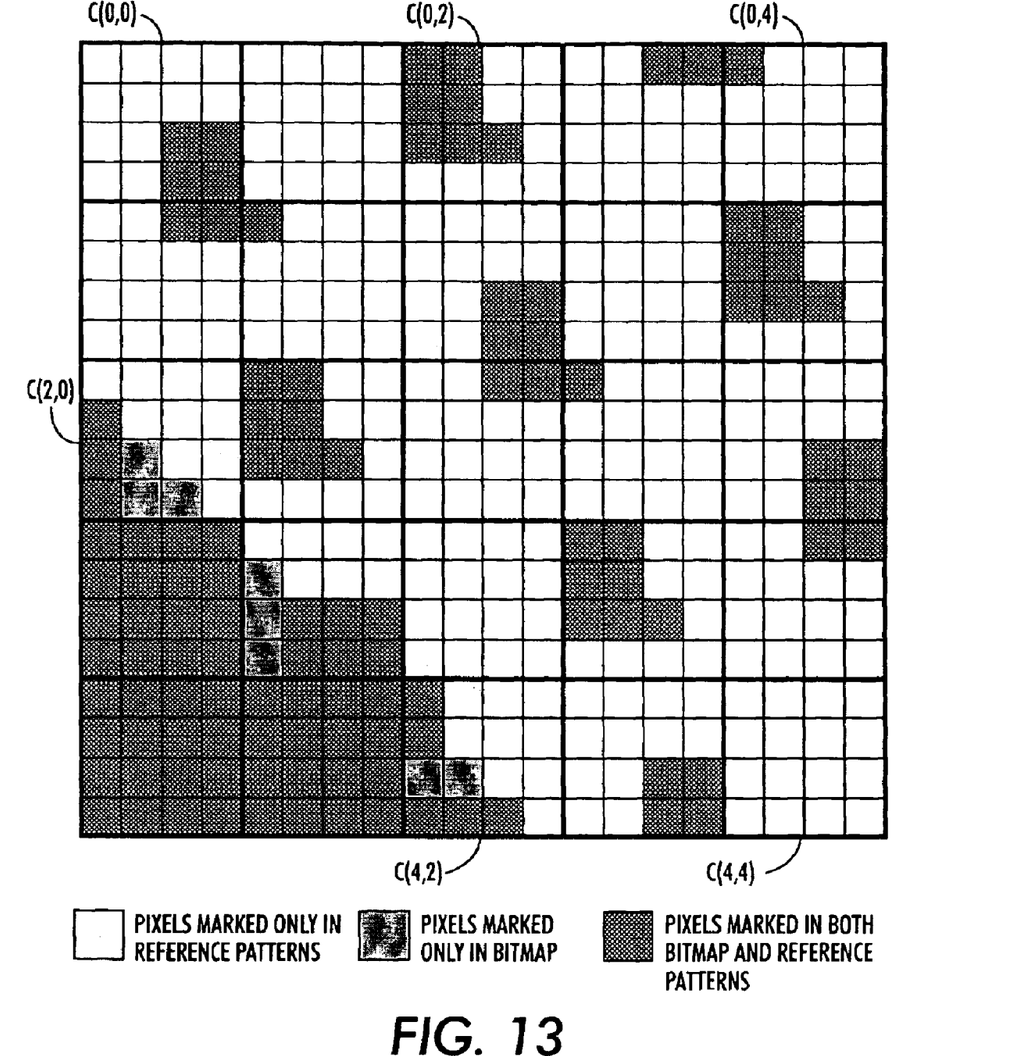
FIG. 13 schematically illustrates the tiles of the bit-map of FIG. 3 overlaid on the reference pattern tiles of FIG. 12.

FIG. 13 schematically illustrates the bit-map of FIG. 3 overlaid on the reference patterns of FIG. 12. The tiles of the bit-map that do not match their respective reference pattern tiles correspond to those tiles wherein at least one marked pixel of an image tile does not overlie a marked pixel of the reference pattern tile. In this example, image tiles C(2, 0), C(1, 3) and C(2, 4) do not match their reference patterns, and thus can be considered to be non-uniform areas. The image tiles that match their respective reference pattern tiles can be considered uniform areas.

It should be appreciated that, depending upon the manner in which half-toning is performed, a given tile C(0, 0) through C(4, 4) in the bit-map of FIG. 3 can have a plurality of corresponding reference patterns for a given marked pixel count. In this case, a tile having a plurality of corresponding reference pattern tiles would be compared to each of such corresponding reference pattern tiles.

The invention has been described with reference to disclosed embodiments, and it will be appreciated that variations and modifications can be affected within the spirit and scope of the invention.

What is claimed is:

1. A method of printing comprising:
    partitioning a half-toned black bit map into a plurality of N-pixel tiles, each N-pixel tile having a marked pixel count M, and wherein the half-toned black bit map is produced pursuant to a predetermined half-toning procedure;
    for each N-pixel tile, determining whether an N-pixel tile comprises a portion of a half-toned uniform region;
    generating a candidate pixel array comprising a plurality of N-pixel candidate tiles respectively associated with the N-pixel image tiles, wherein an N-pixel candidate tile includes marked pixels only if the associated N-pixel image tile comprises a portion of a half-toned uniform region and the number of marked pixels in the associated N-pixel image tile is at least a predetermined percentage of N, and wherein the number of marked pixels in some of N-pixel candidate tiles having marked pixels is less than the marked pixels of the associated N-pixel image tile;
    printing black at pixel locations identified by the black bit-map; and
    printing a non-black color at selected ones of pixel locations identified by the candidate pixel array.

2. The method of claim 1 wherein an N-pixel candidate tile having marked pixels comprises a subset of an associated N-pixel image tile that comprises a portion of a half-toned uniform region.

3. The method of claim 1 wherein an N-pixel candidate tile having marked pixels comprises a subset of an associated N-pixel image tile and includes fewer marked pixels than such associated N-pixel image tile if such associated N-pixel tile includes less than about 0.8N marked pixels.

4. The method of claim 1 wherein each N-pixel image tile includes an associated pixel darkening sequence that is employed when the N-pixel image tile comprises a portion of a half-toned uniform region, and wherein each of the N-pixel candidate tiles that include marked pixels is marked in substantially the same pixel darkening sequence as an associated image tile, and wherein some of the N-pixel candidate tiles are marked to less dark levels than the associated image tiles.

5. The method of claim 1 wherein determining whether an N-pixel image tile comprises a portion of a half-toned uniform region comprises comparing an N-pixel image tile with an associated N-pixel reference tile that comprises a half-toned binary pattern that would be produced by the predetermined half-toning procedure for such N-pixel tile if the portion of the original data that resulted in such N-pixel tile were of uniform lightness.

6. The method of claim 1 wherein determining whether an N-pixel image tile comprises a portion of a half-toned uniform region comprises comparing an N-pixel image tile with an associated N-pixel reference tile that comprises a half-toned binary pattern that would be produced by the predetermined half-toning procedure for such N-pixel tile if the portion of the original data that resulted in such N-pixel tile were of uniform lightness, wherein the N-pixel reference tile includes the same number of marked pixels M as the N-pixel tile to which it is being compared.

7. The method of claim 1 wherein the predetermined percentage is in the range of about 50 percent to about 80 percent.

8. The method of claim 1 wherein the predetermined percentage is in the range of about 70 percent to about 80 percent.

9. The method of claim 1 wherein the predetermined percentage is about 80 percent.

10. The method of claim 1 wherein an N-pixel candidate tile having marked pixels represents a portion of a half-toned uniform region.

11. The method of claim 1 wherein the number of marked pixels in an N-pixel candidate tile having marked pixels is a function of a number by which the number of marked pixels of the associated N-pixel image tile exceeds the predetermined percentage of N.

12. The method of claim 1 wherein printing a non-black color comprises printing at least one of cyan, magenta and yellow at selected ones of pixel locations identified by the candidate pixel array.

13. The method of claim 1 wherein printing a non-black color comprises printing only one of cyan, magenta and yellow at selected ones of pixel locations identified by the candidate pixel array.

14. A method of printing comprising:

partitioning a half-toned black bit map into a plurality of N-pixel tiles, each N-pixel tile having a marked pixel count M, and wherein the half-toned black bit map is produced pursuant to a predetermined half-toning procedure;

for each N-pixel tile, determining whether an N-pixel tile comprises a portion of a half-toned uniform region;

generating a candidate pixel array comprising a plurality of N-pixel candidate tiles respectively associated with the N-pixel image tiles, wherein an N-pixel candidate tile includes marked pixels only if the associated N-pixel image tile comprises a portion of a half-toned uniform region and the number of marked pixels in the associated N-pixel image tile is at least a predetermined percentage of N, and wherein the number of marked pixels in some of the N-pixel candidate tiles is less than the marked pixels of the associated N-pixel image tile;

ANDing the candidate pixel array with a predetermined first non-black color pixel pattern to produce a first non-black color candidate pixel array;

ANDing the candidate pixel array with a predetermined second non-black color pixel pattern to produce a second non-black color candidate pixel array;

ORing the first non-black color candidate pixel array with a first non-black color bit-map to produce a modified first non-black color bit map;

ORing the second non-black color candidate pixel array with a second non-black color bit-map to produce a modified second non-black color bit map;

printing black at pixel locations identified by the black bit-map; and printing the first non-black color at pixel locations identified by the modified first non-black color bit-map; and printing the second non-black color at pixel locations identified by the modified second non-black color bit-map.

15. The method of claim 14 wherein an N-pixel candidate tile having marked pixels comprises a subset of an associated N-pixel image tile that comprises a portion of a half-toned uniform region.

16. The method of claim 14 wherein an N-pixel candidate tile having marked pixels comprises a subset of an associated N-pixel image tile and includes fewer marked pixels than such associated N-pixel image tile if such associated N-pixel tile includes less than about 0.8N marked pixels.

17. The method of claim 14 wherein each N-pixel image tile includes an associated pixel darkening sequence that is employed when the N-pixel image tile comprises a portion of a half-toned uniform region, and wherein each of the N-pixel candidate tiles that include marked pixels is marked in substantially the same pixel darkening sequence as an associated image tile, and wherein some of the N-pixel candidate tiles are marked to less dark levels than the associated image tiles.

18. The method of claim 14 wherein determining whether an N-pixel image tile comprises a portion of a half-toned uniform region comprises comparing an N-pixel image tile with an associated N-pixel reference tile that comprises a half-toned binary pattern that would be produced by the predetermined half-toning procedure for such N-pixel tile if the portion of the original data that resulted in such N-pixel tile were of uniform lightness.

19. The method of claim 14 wherein determining whether an N-pixel image tile comprises a portion of a half-toned uniform region comprises comparing an N-pixel image tile with an associated N-pixel reference tile that comprises a half-toned binary pattern that would be produced by the predetermined half-toning procedure for such N-pixel tile if the portion of the original data that resulted in such N-pixel tile were of uniform lightness, wherein the N-pixel reference tile includes the same number of marked pixels M as the N-pixel tile to which it is being compared.

20. The method of claim 14 wherein the predetermined percentage is in the range of about 50 percent to about 80 percent.

21. The method of claim 14 wherein the predetermined percentage is in the range of about 70 percent to about 80 percent.

22. The method of claim 14 wherein the predetermined percentage is about 80 percent.

23. The method of claim 14 wherein an N-pixel candidate tile having marked pixels represents a portion of a half-toned uniform region.

24. The method of claim 14 wherein the number of marked pixels in an N-pixel candidate tile having marked pixels is a function of a number by which the number of marked pixels of the associated N-pixel image tile exceeds the predetermined percentage of N.

25. The method of claim 14 wherein printing black is performed prior to printing the first non-black color and, printing the second non-black color.

26. The method of claim 14 wherein printing black is preformed after printing the first non-black color and printing the second non black color.

* * * * *